May 6, 1941.   C. D. BRIDDELL   2,240,754
ANIMAL TRAP
Filed April 13, 1938   3 Sheets-Sheet 1
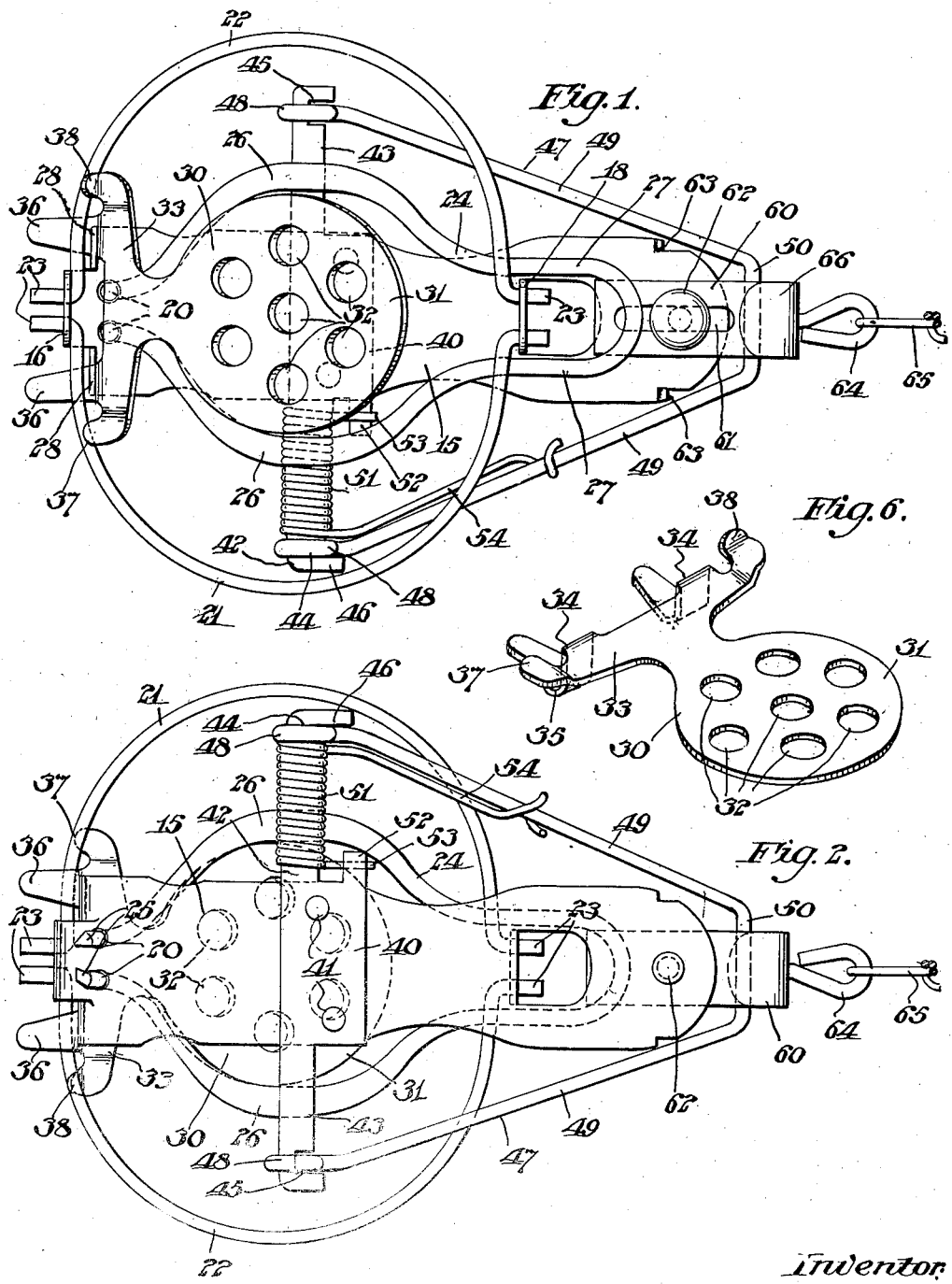
Inventor
Charles D. Briddell,
By Jas. C. Webuswith
Attorney.

May 6, 1941.   C. D. BRIDDELL   2,240,754
ANIMAL TRAP
Filed April 13, 1938   3 Sheets-Sheet 2
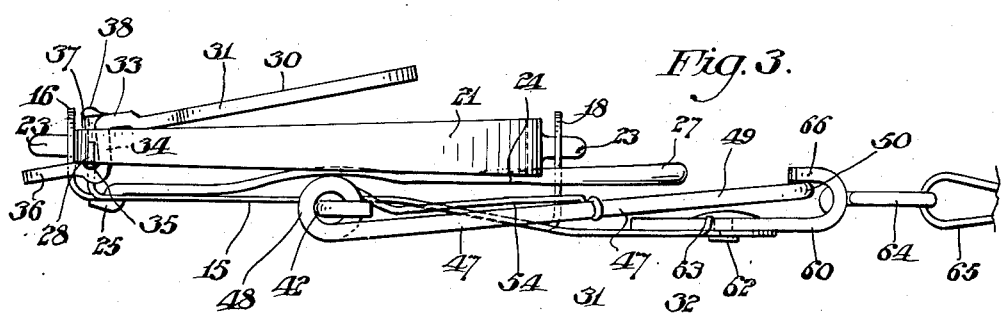
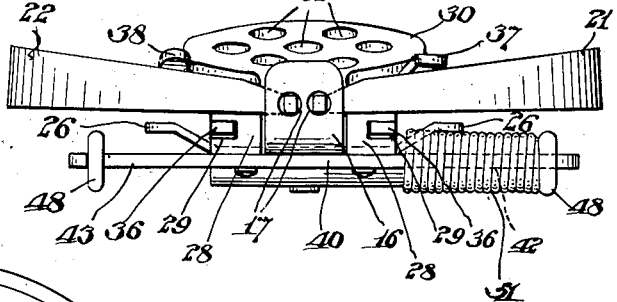
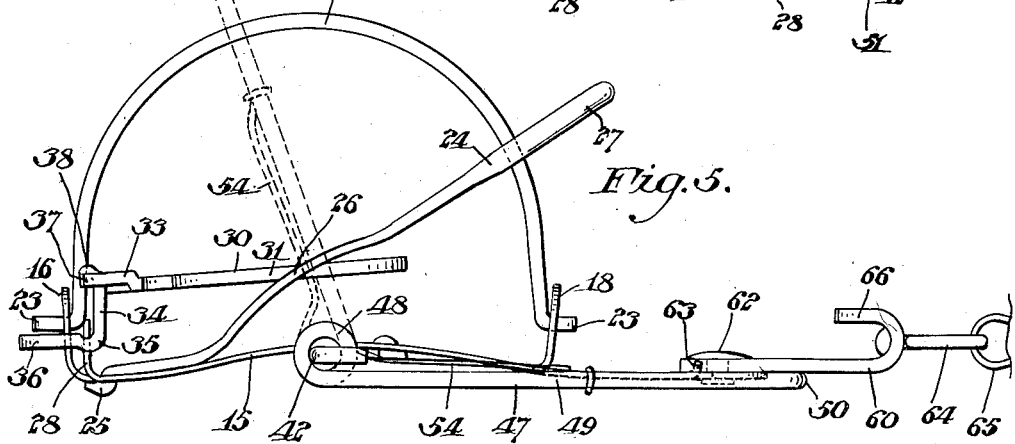
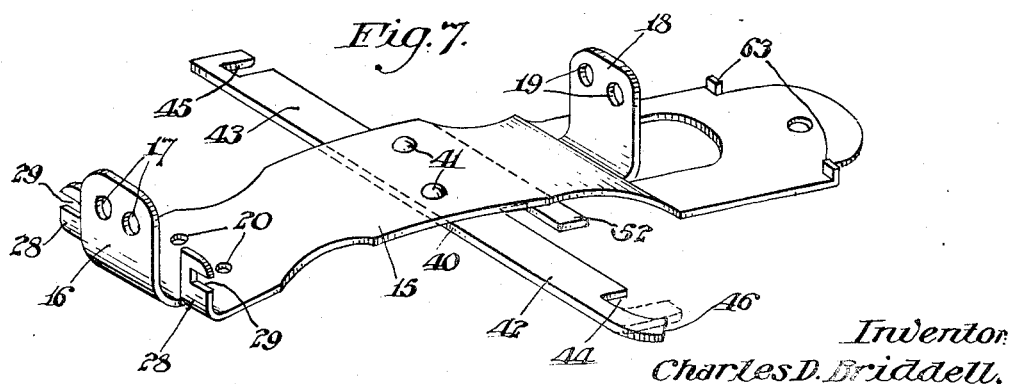
Inventor
Charles D. Briddell,
By Jas. C. Hobersmith
Attorney May 6, 1941.  C. D. BRIDDELL  2,240,754
ANIMAL TRAP
Filed April 13, 1938  3 Sheets-Sheet 3
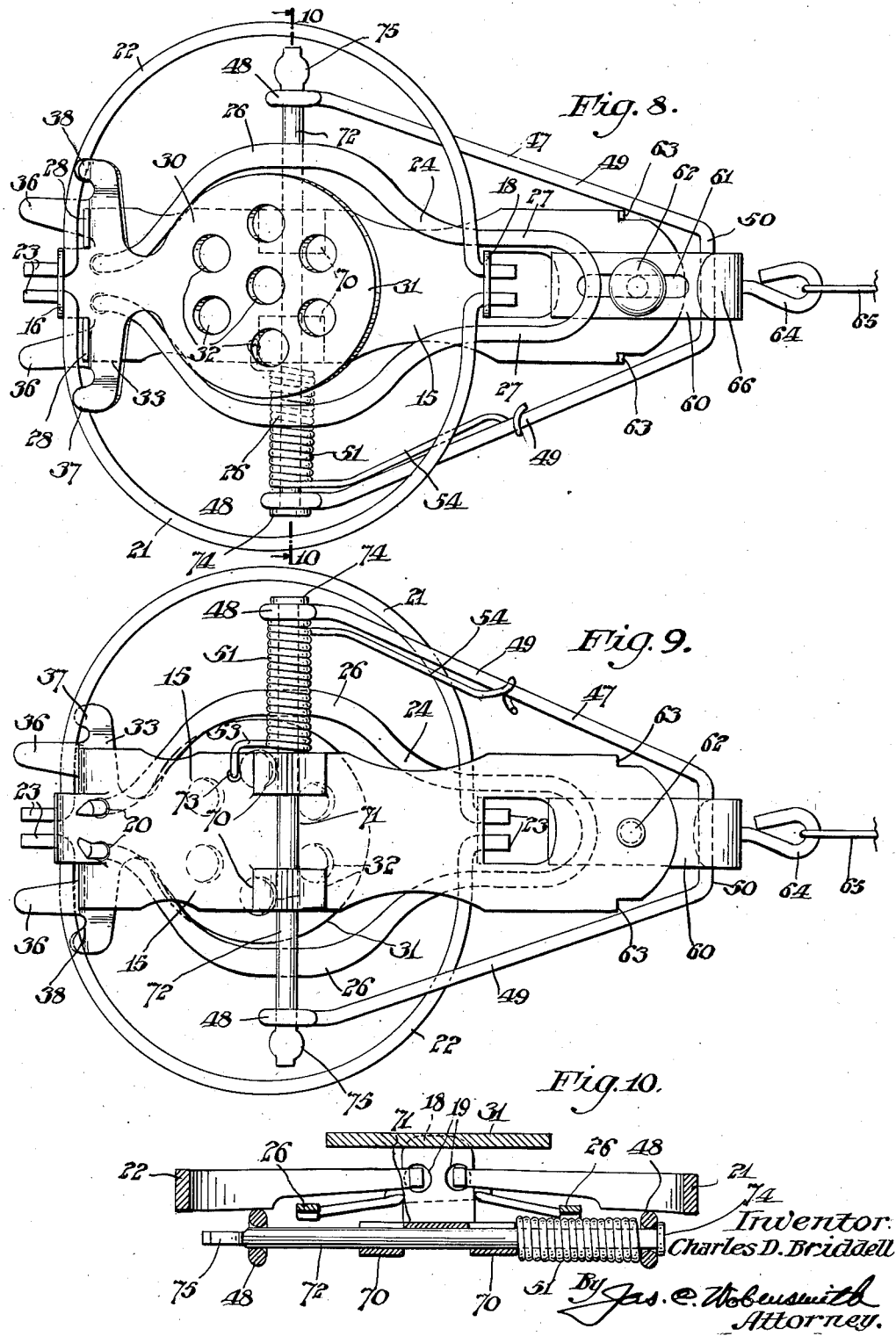
Inventor.
Charles D. Briddell
By Jas. E. Hobensmith
Attorney.

Patented May 6, 1941

2,240,754

UNITED STATES PATENT OFFICE 2,240,754

ANIMAL TRAP

Charles D. Briddell, Crisfield, Md.; Evelyn Andrews, Charles D. Briddell, Jr., Thomas H. Briddell, and Willis H. Briddell, executors of Charles D. Briddell, deceased, assignors to Animal Trap Company of America, Lititz, Pa., a corporation of Pennsylvania Application April 13, 1938, Serial No. 201,694

6 Claims. (Cl. 43—88)

This invention relates to animal traps and more particularly to an improved form of trap having a guard or auxiliary jaw for holding the animal after it is caught and for preventing the animal from gnawing or wringing off his leg.

In the ordinary steel trap the closing of the jaws thereof frequently causes the leg of the animal to break, or if the trap does not break the animal's leg, the animal, in his efforts to escape, often breaks the bone and may then gnaw the fleshy, sinuous and other portions of the leg, and thus will be enabled to escape.

Efforts have heretofore been made to prevent the escape of the animal by providing a guard which strikes and kills the animal caught in the trap. This type of trap is objectionable, however, because of the injury to the pelt by reason of the violence of the blow and also because of the excessive size and cost of such traps. Other difficulties arise also because traps of this character cannot be placed in diving holes, small leads or runs and other restricted places.

Other types of traps have also been suggested which utilize guards of various kinds for holding the animal after it is caught, but difficulties are encountered in setting these traps and the structure of the traps of this character heretofore available is such that the trap itself frequently acts to assist the animal in escaping and thus defeats the purpose of the trap. Furthermore, the traps of this character heretofore available frequently bruise or injure the animal, and in so doing damage the pelt.

The principal object of the present invention is to provide an animal trap of the spring actuated jaw type in which the objectionable features heretofore encountered have been overcome.

A further object of the present invention is to provide a trap having an auxiliary guard which may be quickly and easily set independently of the setting of the spring actuated jaws.

A further object of the present invention is to provide a trap in which an auxiliary guard is used which will tend to force the leg into the jaws and assist the jaws in retaining the animal.

A further object of the present invention is to provide a trap which may be readily and easily set by the trapper, and in which likelihood of injury to the trapper is eliminated.

A further object of the present invention is to provide, in an animal trap, an improved form of trigger treadle or pan.

A further object of the present invention is to provide, in an animal trap, an improved form of trigger mechanism.

A further object of the present invention is to provide, in an animal trap of the spring actuated jaw type, a simple and efficient trigger mechanism by means of which both jaws of the trap will be restrained against movement or displacement when the trap is in the set condition.

A further object of the present invention is to provide, in an animal trap, a trigger treadle which will be of large size and which, however, will not interfere with the operation of the other portions of the trap.

A further object of the present invention is to provide, in an animal trap, a trigger mechanism in which the entire movement of the treadle, when the trap is sprung, will be downward, thereby eliminating any tendency of the treadle or pan to throw the leg of the animal outward before it is gripped by the spring actuated jaws.

Other objects of the invention will appear from the annexed specification and claims.

The nature and characteristic features of the invention will be more readily understood from the following description, taken in connection with the accompanying drawings forming part hereof, in which:

Figure 1 is a top plan view of a preferred embodiment of the present invention, showing the trap in completely set condition;

Fig. 2 is an underneath plan view of the trap as shown in Fig. 1;

Fig. 3 is a side elevational view of the trap as shown in Fig. 1;

Fig. 4 is an end elevational view of the trap shown as in Fig. 1, looking from the left;

Fig. 5 is a side elevational view of the trap shown in Fig. 1 but showing the trap in the sprung position and indicating the character of the action of the auxiliary guard;

Fig. 6 is a perspective view of the treadle removed from the trap;

Fig. 7 is a view in perspective of the spring base member constituting a portion of the means for actuating the main jaws of the trap;

Fig. 8 is a top plan view of a modified form of trap of the present invention;

Fig. 9 is an underneath plan view of the trap as shown in Fig. 8; and

Fig. 10 is a vertical sectional view taken approximately on the line 10—10 of Fig. 8.

It will, of course, be understood that the description and drawings herein contained are illustrative merely, and that various modifications and changes may be made in the structure disclosed without departing from the spirit of the invention.

Referring more particularly to Figs. 1 to 7, inclusive, of the drawings, the trap as there shown includes a base member 15 which is preferably formed of flat spring steel, for purposes hereinafter referred to. The base member 15 is curved upwardly between the ends thereof and has, at one end thereof, a turned up standard 16 provided with two holes 17 extending therethrough, and, spaced from the other end, another standard 18 struck up from the base member 15, and which is also provided with two holes 19 extending therethrough. The base member 15 is also provided with a pair of apertures 20.

The main jaw members 21 and 22 of the trap are of the customary U-shape. The jaw members 21 and 22 have outwardly extending end portions 23 pivotally journaled in the holes 17 in the standard 16 and the holes 19 in the standard 18, to permit of the requisite movement of the jaw members 21 and 22 from a substantially horizontal position, when the trap is set, to a vertical gripping and holding position when the trap is sprung.

A jaw actuating yoke 24 is provided, the same being mounted on the base member 15 as hereinafter set forth. The yoke 24 is made from round spring metal and a portion on each side thereof is flattened to increase the flexibility of those portions. The terminal ends 25 of the wire, of which the yoke member 24 is formed, extend through the apertures 20 in the base member 15 and are bent over on the underside thereof to lock the yoke member 24 in position. Those parts of the flattened portions of the yoke member 24 which are adjacent the ends 25 bear on the top surface of the base member 15, the arrangement being such that when the yoke member 24 is brought to position to set the trap, the flattened portions thereof will be flexed, as also will the metal of the base member 15. The yoke 24 also has its flattened portions curved outwardly as at 26 and so shaped as to be clear of the treadle and not interfere with the action thereof.

The yoke 24 has substantially parallel portions 27 at the outer extremity thereof for engagement respectively with the outside surfaces of the main jaws 21 and 22 for moving the jaws 21 and 22 to the animal engaging or the sprung position. These portions 27 are preferably circular in cross section to provide a camming action on the sides of the jaws 21 and 22 with which they contact, and at the same time have, with the jaws, a wedge-like action. The base member 15 is also provided at the end adjacent the standard 16 with a pair of turned-up portions 28 each of which is provided with a notch 29 for carrying a portion of the treadle or pan 30, and thus providing the fulcrum therefor.

The preferred form of treadle or pan 30 is shown in Fig. 6 and includes a flat generally circular plate 31 which is preferably provided, as at 32, with a plurality of apertures extending therethrough for permitting the passage past the treadle 30 of sand, mud, or water, in such manner that the same will not interfere with the proper operation of the trap when placed in the set condition. The apertures 32 also permit the treadle or pan 30 to be made lighter and of selected weight.

The flat portion 31 of the treadle or pan 30 has integrally connected therewith a transversely extending strip 33 from which extend a pair of members 34, said members 34 extending first downwardly, then being curved as at 35 about a small radius, thereby to provide a recess at the bottom of the downwardly extending portion, and thence extending rearwardly to provide fingers 36 which may be used to assist in the setting of the trap in a manner to be hereinafter explained.

The under edge of the notch 29 provided in each of the turned-up portions 28 of the base member 15 hereinbefore referred to, thereby provides in conjunction with the recesses 35 a means of pivotal support for the treadle or pan 30 in which there will be no tendency to creep when the trap is sprung by the depression of the treadle 30. With this arrangement, there is eliminated the use of rivets or bolts for the pivots, which as well known frequently become rusty and prevent the free actuation of the trigger mechanism, or in other instances become loose with the resulting uncertainty of the amount of pressure on the treadle required to spring the trap.

The transversely extending strip 33 of the treadle device 30 is also provided with outwardly extending lugs 37 and 38 which are adapted to engage the main jaw members 21 and 22 and hold the same open when the trap is set.

Heretofore, when it has been attempted to provide a spring actuated jaw trap with a single piece trigger device, difficulties were encountered in so adjusting the mechanism that the trap would be sprung by the proper degree of pressure upon the treadle. In the present arrangement, this difficulty is overcome by the provision of the fingers 37 and 38, one of which, 37, is preferably left flat and the other of which, 38, is bent upwardly at its outer end as indicated in Figs. 4 and 6 of the drawings, the amount of the upward bend of the finger 38 being determined by the force of the spring tending to close the jaws. It will be found that if the trap requires too much pressure upon the treadle 30 to spring the same, further upbending of the finger 38 will render the same more sensitive; or on the other hand, if the trap tends to spring too easily, the finger 38 may be bent back to a more nearly horizontal position until the proper degree of sensitivity is obtained.

The base member 15 preferably has a plate 40 secured thereto in any preferred manner, such as by rivets 41 or the like, and has laterally and outwardly extending arms 42 and 43 preferably located at a position approximately midway between the pivotal ends of the main jaw members 21 and 22. The arms 42 and 43 preferably have the ends thereof notched as at 44 and 45, respectively and the extremity of the end of the arm 42 may be bent back as at 46 (see Fig. 7) to permit the assembly of certain of the parts thereon.

An auxiliary guard member 47 has its ends thereof formed into eyes 48 for pivotal movement on the ends of the arms 42 and 43. The auxiliary guard 47 is preferably shaped as illustrated particularly in Figs. 1 and 2, with angularly disposed side portions 49 connected by a transverse straight portion 50 to provide a substantially V-shaped guard. The guard 47 is movable through a large arc which is substantially a complete circle. It will also be noted that the straight portion 50 of the guard 47, in its movement follows a path which is substantially concentric with the jaws 21 and 22 in their closed position.

A coil spring 51 is mounted on the arm 42 to one side of the base member 15 and an outwardly extending lug 52 formed on the plate 40 may be provided for engagement with one end 53 of the spring 51. The other end 54 of the spring 51 preferably extends along, and is disposed in engagement with, one of the angularly disposed side portions 49 of the auxiliary guard 47 for actuating the guard 47 as hereinafter indicated.

The base member 15 preferably has mounted at the end thereof, and beyond the standard 18, an auxiliary guard trigger mechanism which includes a latch 60. The latch 60 is provided with a slot 61, and a bolt or rivet 62 mounted in the base member 15 extends through the slot 61, permitting sliding and swinging movement of the latch 60. Lugs 63 may be bent up from the base member 15 to restrict and limit the sidewise movement of the latch 60. The latch 60 preferably has secured at the outer end thereof an eye 64 to which the chain 65, by which the trap is secured, may be attached. The latch 60 has a bent back portion 66 for engagement with the portion 50 of the auxiliary guard 47 for holding the guard 47 in set position but permitting the release thereof when the animal struggles to escape.

The trap illustrated in Figs. 8, 9, and 10 is substantially the same as the trap shown in Figs. 1 to 7, inclusive. A different construction of base member 15 is however employed. The base member 15 has curved portions 70 at the outer edges pressed out of the plane of the base member 15, and preferably downwardly, and an intermediate curved portion 71, also pressed out of the plane of the base member 15, and preferably upwardly. These curved portions 70 and 71 permit the elimination of the plate member 40 shown particularly in Figs. 1 and 2, and provide a suitable means for mounting a pin 72 transversely in the base member 15. A hole 73 is provided in the base member 15 for anchoring the end 53 of the spring 51.

The pin 72 is preferably enlarged at one end as at 74 and the other end, after insertion through one eye 48 of the guard member 47, the support provided by the curved portions 70 and 71 of the plate member 15, the coil portion of the spring 51, and the other eye 48 of the guard member 47, is flattened as at 75 to hold it in position.

The operation of the trap will now be explained, it being understood that the same may be used either with or without the auxiliary guard 47 as desired. In fact, in simpler forms of the trap, the auxiliary guard 47 may be omitted entirely. The operation will therefore be explained in the first instance without regard to the use of the auxiliary guard 47.

In setting the trap, the spring yoke 24 is pressed downwardly to a substantially horizontal position against the force exerted by the base member 15 and the resilience of the yoke itself and the main jaws 21 and 22 of the trap may then be readily separated and spread in substantially horizontal positions as shown in Figs. 1 to 4 of the drawings.

The treadle 30 is then moved to a position such that the trigger fingers 37 and 38 lie over and in engagement with the respective main gripping jaws 21 and 22 to hold these jaws 21 and 22 in the set position. The movement of the treadle 30 in setting may, if desired, be effected by turning the trap upside down while the jaws 21 and 22 are held separated, since the weight of the disk portion 31 of the treadle 30 is sufficient to swing the trigger fingers 37 and 38 into holding position, but preferably the operation may be effected by the manual depression of the auxiliary fingers 36. Upon the release of the hand pressure on the jaws 21 and 22, the jaws 21 and 22 will then be held in set position by the trigger fingers 37 and 38.

As before pointed out, the trap in certain conditions of use may be utilized as thus set and without setting the auxiliary guard member 47. It will be noted that the auxiliary guard member 47 in the unset position thereof lies on the underside of the trap substantially horizontal and does not interfere in any way with such use.

If it is desired, however, to use the auxiliary guard 47, before setting the main jaw members 21 and 22, this guard 47 is swung from its initially horizontal position on the underside of the trap against the force of the spring 51 to a horizontal position on the upper face of the trap whereupon the latch 60 may be pushed into engagement therewith as illustrated in Figs. 1 and 3.

The trap is now ready for use. A large surface is provided at the treadle 30 and when the animal places its foot thereon, the downward movement of the treadle 30 withdraws the trigger fingers 37 and 38 from their contact with the main jaw members 21 and 22 and these jaw members 21 and 22 are forced upwardly by the action of the base member 15 and the spring yoke 24 which engages the outer edges of the jaw members 21 and 22.

It will be noted that the movement of the treadle 30 for release is entirely downward so that the animal may be caught high up on the leg and there is no tendency to force the leg of the animal from the jaws. In the attempts of the animal to escape, the tugging on the trap causes the trap to be drawn so that the latch 60 is separated from its engagement with the auxiliary guard member 47 and the guard member 47 is released. The movement of the straight portion 50 of the auxiliary guard member 47 by the force exerted by the spring 51 is substantially concentric with the curvature of the main jaws 21 and 22 of the trap, and this member 47 moves to a position as indicated in dotted lines in Fig. 5, where it bears against the body of the animal and prevents the animal from having access to the leg or other portion of the body engaged by the main jaws 21 and 22. The guard 47 is also wide enough so as not to become entangled with the foot of the animal and it forces the body of the animal toward the ends of the jaws where they are close together and thus tends to wedge the leg of the animal into a tighter gripped position.

The range of movement of the guard 47 in the concentric path holds the animal in the trap more effectively and prevents it from contorting and twisting its body to such extent as would tend to effect its release. The action of the guard 47 is quite effective even if the animal is caught by the toes rather than high up on the leg, by reason of its engagement with the body of the animal, and undesired movements of the body of the animal are prevented no matter what its position may be when caught.

I claim:

1. In an animal trap, a base member, a pair of curved gripping jaws pivotally mounted on said base member, spring means for closing said jaws, means for holding said jaws in set position, a spring actuated guard member, means for mounting said guard member for movement in a path substantially concentric to the gripping jaws when said jaws are in gripping position, said mounting means including members in alinement and transversely disposed with respect to the pivotal axis of the gripping jaws and having the ends of said guard member pivotally connected thereto, said guard member comprising a wire member having side portions flaring from its extremity to the pivotally connected ends, and means independent of the jaw holding means for holding said guard member in set position.

2. In an animal trap, a base member, a pair of curved gripping jaws pivotally mounted on said base member, spring means for closing said jaws, means for holding said jaws in set position, a spring actuated guard member, means for mounting said guard member for movement in a path substantially concentric to the gripping jaws when said jaws are in gripping position, said mounting means including members disposed between the ends of the gripping jaws and having the ends of said guard member pivotally connected thereto, and means independent of the jaw holding means for holding said guard member in set position.

3. In an animal trap, a substantially horizontal base member, a pair of curved gripping jaws pivotally mounted on said base member, spring means for closing said jaws, means for holding said jaws in set position, a spring actuated guard member, means for mounting said guard member for movement in a path substantially concentric to the gripping jaws when said jaws are in gripping position and for movement below the bottom of said base member, said mounting means including members transversely disposed between the ends of the gripping jaws and having the ends of said guard member pivotally connected thereto.

4. In an animal trap, a substantially horizontal base member, a pair of curved gripping jaws pivotally mounted on said base member, spring means for closing said jaws, means for holding said jaws in set position, a spring actuated guard member, means for mounting said guard member for movement in a path substantially concentric to the gripping jaws when said jaws are in gripping position and for movement below the bottom of said base member, said mounting means including members transversely disposed between the ends of the gripping jaws and having the ends of said guard member pivotally connected thereto, and means independent of the jaw holding means for holding said guard member in set position.

5. A trap comprising a base, a pair of curved jaws, a spring for closing said jaws and means for holding said jaws in set position, said means consisting of a sheet metal treadle having integral fingers for contacting said jaws and holding them against the action of said spring, and integral lugs extending downwardly and loosely interconnected with said base to provide pivotal connection therewith, the ends of said lugs extending laterally beyond said base to provide setting fingers for manually raising said treadle to set position.

6. A trap comprising a base, a pair of curved jaws, a spring for closing said jaws and a treadle having integral fingers for holding said jaws in set position and integral lugs for providing pivotal connection with said base; said base consisting of a single piece of spring steel having portions bent upwardly to provide integral supports for said jaws, and integral supports slotted to receive said lugs on said treadle to provide loose pivotal connection therewith.

CHARLES D. BRIDDELL.